United States Patent
Ueda et al.

(10) Patent No.: US 8,021,580 B2
(45) Date of Patent: Sep. 20, 2011

(54) CONDUCTIVE METAL PASTE

(75) Inventors: Masayuki Ueda, Tsukuba (JP); Hiroshi Saito, Tsukuba (JP); Kazuo Hosoya, Tsukuba (JP); Noriaki Hata, Tsukuba (JP); Yorishige Matsuba, Tsukuba (JP)

(73) Assignee: Harima Chemicals, Inc., Kakogawa-Shi, Hyogo (JP)

( * ) Notice: Subject to any disclaimer, the term of this patent is extended or adjusted under 35 U.S.C. 154(b) by 195 days.

(21) Appl. No.: 11/571,249

(22) PCT Filed: Jun. 23, 2004

(86) PCT No.: PCT/JP2004/008806
§ 371 (c)(1),
(2), (4) Date: Jan. 18, 2007

(87) PCT Pub. No.: WO2006/011180
PCT Pub. Date: Feb. 2, 2006

(65) Prior Publication Data
US 2008/0105853 A1    May 8, 2008

(51) Int. Cl.
*H01B 1/02*    (2006.01)

(52) U.S. Cl. ........ 252/513; 252/511; 252/512; 252/514; 252/519.3; 427/212; 427/216; 427/220; 428/357; 977/773

(58) Field of Classification Search ............... 252/513, 252/512, 514, 500, 503, 511, 519.3; 427/376.6, 427/212, 216, 220, 375; 977/773; 428/357; 156/89.18, 89.12; 257/E21.174, E21.272
See application file for complete search history.

(56) References Cited

U.S. PATENT DOCUMENTS

| | | | |
|---|---|---|---|
| 6,036,889 A * | 3/2000 | Kydd | ........................... 252/512 |
| 6,190,731 B1 | 2/2001 | Tecle | |
| 7,081,214 B2 * | 7/2006 | Matsuba et al. | ............... 252/512 |
| 2002/0043323 A1 * | 4/2002 | Watanabe et al. | .......... 156/89.18 |
| 2003/0108664 A1 * | 6/2003 | Kodas et al. | ................... 427/125 |
| 2003/0124259 A1 * | 7/2003 | Kodas et al. | ................ 427/376.6 |
| 2007/0098883 A1 * | 5/2007 | Itoh et al. | ........................ 427/180 |
| 2007/0104878 A1 * | 5/2007 | Kodas et al. | ................... 427/375 |
| 2007/0213228 A1 * | 9/2007 | Zhao | ............................. 505/430 |

FOREIGN PATENT DOCUMENTS

| | | |
|---|---|---|
| EP | 1 339 073 A1 | 8/2003 |
| EP | 1 542 239 A1 | 6/2005 |
| JP | 3-34211 | 2/1991 |
| JP | 11-7830 | 1/1999 |
| JP | 2004-124237 | 4/2004 |
| WO | WO 02/35554 A1 | 5/2002 |

* cited by examiner

*Primary Examiner* — Ling-Siu Choi
*Assistant Examiner* — Bijan Ahvazi
(74) *Attorney, Agent, or Firm* — Knobbe, Martens, Olson & Bear, LLP

(57) ABSTRACT

The present invention provides a conductive metal paste, available for fabrication of a metal fine particle sintered product layer, which has excellent adhesion to a surface of an underlying substrate such as a glass substrate and also has good conductivity. The conductive metal paste according to the present invention contains, per 100 parts by mass of the metal fine particles whose average particle size is 1 to 100 nm, 10 to 60 parts by mass in total of one or more compounds which are used in a coating molecular layer on a surface of a metal fine particle and which have a group capable of coordinate bonding to a metal element contained in the metal fine particles via a lone pair held by a nitrogen, oxygen, or sulfur atom, and also contains one or more metal compounds which are reduced by heating up to 250° C. or higher to be able to precipitate a metal atom such that a total amount of metals contained in the metal compound is within a range from 0.3 to 7 parts by mass, and further, 100 to 500 parts by mass of an amine-based solvent capable of dissolving the metal compounds blended per 10 parts by mass in total of metals in the metal compounds, wherein all of these components are uniformly dissolved and dispersed in an organic solvent used as a dispersion solvent for the metal fine particles.

14 Claims, No Drawings

CONDUCTIVE METAL PASTE

This application is the U.S. National Phase under 35 U.S.C. §371 of International Application PCT/JP2004/008806, filed Jun. 23, 2004. The International Application was published under PCT Article 21(2) in a language other than English.

TECHNICAL FIELD

The present invention relates to a conductive metal paste, and particularly to a conductive metal paste which is available for forming a conductive thin film of a metal fine particle sintered product type by utilizing metal fine particles as a conductive medium and then by sintering the metal fine particles one another through a heat treatment, and also which can achieve high adhesion between the conductive thin film thus fabricated and an underlying substrate.

BACKGROUND ART

A conventional conductive metal paste utilizing metal powders as a conductive medium has attempted to achieve electrical contact among the metal powders as well as to achieve adhesion to a surface of a substrate by blending an adequate amount of a binder resin component into the metal powders and then by curing this binder resin component. On the other hand, instead of using such metal powders, utilization of extremely fine metal particles having an average particle size of 100 nm or less, that we call metal nanoparticles, allows for mutual sintering of the metal fine particles by subjecting them to a heat treatment at a relatively low temperature. Practical use of characteristics which are inherent to the metal nanoparticles has led to a development of various kinds of conductive metal pastes which are used for fabricating a conductive layer comprising a layer of metal nanoparticle sintered product.

In a field involved in recent electronic equipment, there has progress in miniaturization of a wiring pattern on a wiring substrate to be used. In addition, also in respect to a metal thin layer used for forming various kinds of electrode pattern parts, there has progress in utilization of a metal thin layer having an ultrathin thickness. In this case, it has extensively been studied the utilization of a metal nanoparticle sintered product layer which is formed by using a conductive metal paste containing metal nanoparticles as a conductive medium, instead of utilizing a metal thin layer formed by a plating method. When fine wiring formation or thin layer formation is achieved by using a screen printing process for example, it is attempted to make use of a dispersion of metal fine particles having an extremely small particle size in order to graphically draw an ultrafine pattern or to form a thin film coated layer having an extremely thin thickness. At the present moment, a dispersion of gold or silver urtrafine particles which is applicable to the above described use has already been commercialized.

When silicate glass or the like is used as a substrate material, many kinds of metals do not exhibit a favorable adhesion characteristic for the flat glass surface, therefore, in the case of a metal film layer formed by a plating method for example, a metal thin layer having a high adhesion with respect to the glass material is beforehand applied to the glass surface, and this coating is used as a plating underlying film layer. Since a metal element to be plated is precipitated out on a surface of a metal which constitutes the plating underlying film layer, the plating underlying film layer and a metal film layer formed by a plating method are strongly adhered to each other via bonding between metal atoms which is created at an interface between the plating underlying film layer and the metal film layer formed by a plating method.

On the other hand, although a metal nanoparticle sintered product layer which is formed by using a conductive metal paste is densely applied to a flat glass surface as a whole, a region in which the flat glass surface comes into contact with the individual metal nanoparticles is small in area from a microscopic point of view. Therefore, adhesion characteristic of the entire metal nanoparticle sintered product layer may become insufficient depending on its use, even if a metal species used as the metal nanoparticle has a high adhesion with respect to the glass material. For example, if a thermal expansion coefficient of the glass material used as a substrate is different from a substantial thermal expansion coefficient of the metal nanoparticle sintered product layer to be formed and a heating temperature during a sintering treatment is set high, and then a strain stress is accumulated at an interface after cooling down to a room temperature. The strain stress accumulated at the interface tends to be concentrated in a region in which the flat glass surface comes into contact with the individual metal nanoparticles from a microscopic point of view, and consequently the metal nanoparticle sintered product layer may partly be stripped off the flat glass surface.

In addition, a wiring pattern formed on the substrate surface is subject to changes in ambient temperature during its implementation and its use, and further, the strain stress caused by the temperature changes is repeatedly applied to an interface between the metal nanoparticle sintered product layer and the substrate surface. As a result of repeated application of the strain stress to the interface after experiencing several cycles of ambient temperature changes, a part of the metal nanoparticle sintered product layer may frequently be stripped off the flat glass surface even if there are no situations that the metal nanoparticle sintered product layer is partly stripped off the flat glass surface at the beginning of the fabrication process.

A pre-treatment in which a flat glass surface is uniformly coated with a metal layer having high adhesion with respect to a glass material so as to form an underlying metal film layer in advance allows for avoiding and suppressing a phenomenon of partly stripping off a metal nanoparticle sintered product layer, because a strain stress caused at an interface is distributed throughout the underlying metal film layer and a favorable adhesion is provided between the individual metal nanoparticles and the underlying metal film layer. Further, also suggested is that adhesion between a metal nanoparticle sintered product layer formed by blending an adequate amount of a binder resin component into a conductive metal paste containing metal nanoparticles as a conductive medium and a substrate surface is principally provided via a cured binder resin (International Publication WO02/035554 A1). Use of this method, in which an adequate amount of the binder resin component is blended and then timing of sintering the metal nanoparticles is adjusted to timing of curing the binder resin component, achieves formation of a metal nanoparticle sintered product layer exhibiting an excellent conductivity and provision of a high adhesion characteristic given by the blended binder resin.

According to a method which conducts a pre-treatment of forming an underlying metal film layer for example, the pre-treatment in which a uniform underlying metal film layer is beforehand coated throughout a surface of a substrate is performed in combination with a post-treatment in which an excess portion of the underlying metal film layer is etched away after completing the formation of a metal nanoparticle sintered product layer, prior to lithographically drawing a desired fine wiring pattern with a conductive metal paste containing metal nanoparticles through the use of screen printing for example. Thus, this process as a whole still has complications similar to those in the case of a mask plating method. On the other hand, according to a method in which an adequate amount of a binder resin component is blended and then timing of sintering metal nanoparticles is adjusted to timing of curing the binder resin component, complications during this process may be eliminated, however, it is important to properly combine composition of a conductive metal paste per se with conditions of a heat treatment (temperature, time) in order to adjust timing of sintering the metal nanoparticles with timing of curing the binder resin component. Specifically, this process experiences more difficulty in setting a temperature for the heat treatment to a high degree as well as in adjusting timing of sintering the metal nanoparticles to timing of curing the binder resin component.

DISCLOSURE OF THE INVENTION

As with the conductive metal paste disclosed in the above described International Publication WO02/035554 A1, a conductive metal paste which is formed by using metal nanoparticles as a conductive medium and then blending thereinto an adequate amount of a binder resin component is means for adhesively fixing a metal nanoparticle sintered product layer having a good conductive characteristic to a surface of a substrate via a binder resin having a favorable adhesion characteristic. In this case, composition of the binder resin component to be used is controlled and a heat curing temperature compatible with this composition is selected to be within a range from 250° C. to 300° C., as well as the formation of the sintered product is allowed to proceed among the metal nanoparticles to be used at the same temperature as described above.

A temperature at which formation of the sintered product quickly progresses among the metal nanoparticles may exceed 300° C., depending on metal species and average particle sizes of the metal nanoparticles to be used. On the other hand, a curing rate may become higher than necessary at a heat treatment temperature exceeding 300° C., depending on varieties of the binder resin component to be used. Alternatively, a cured binder resin obtained by the heat curing in which a heat treatment is performed at a temperature exceeding 300° C. may be departed from a range of proper polymer chain length and, therefore, may not exhibit a certain characteristic required for a binder resin. Accordingly, if a heat treatment temperature for forming a sintered product among the metal nanoparticles is set at 300° C. or higher, the option for the binder resin components and compositions compatible with the above described range of heat treatment temperature is restricted, and the heat treatment temperature becomes higher together with the increased difficulties in selecting an optimum composition.

On the other hand, although it is also possible to use glass frit as an adhesive between a glass material and a metal instead of using the binder resin, it becomes necessary to conduct a heat treatment at a temperature exceeding 500° C. In addition, the glass frit is excellent as the adhesive between the glass material ant the metal, but may not be compatible with ceramics materials other than the glass materials.

That is, in the case where a heat treatment temperature for forming a sintered product among metal nanoparticles is selected to be within a range from 250° C. to 600° C., general and convenient "means for improving adherence" which can be blended together with metal nanoparticles in a conductive metal paste to be used and which is also available for "means" for improving adherence of the obtained metal nanoparticle sintered product layer with respect to a surface of the substrate has not been found in various means which have conventionally been suggested.

The present invention is intended to solve the above described problems, and an object of the present invention is to provide a conductive metal paste which is available for forming a conductive thin film of a metal fine particle sintered product type by utilizing metal fine particles as a conductive medium and then by sintering the metal fine particles one another through a heat treatment at a temperature selected to be within a range from 250° C. to 600° C. for example, and also which can achieve high adhesion between the conductive thin film thus fabricated and an underlying substrate. Specifically, an object of the present invention is to provide novel "means for improving adherence" which is available for forming a conductive thin film of a metal fine particle sintered product type by sintering the metal fine particles one another through a heat treatment at a temperature selected to be within a range from 250° C. to 600° C. while blending with metal nanoparticles into the conductive metal paste and which exhibits a function of improving adherence between the metal nanoparticle sintered product layer thus obtained and a surface of the substrate at an interface therebetween, and to provide a conductive metal paste using the above described means.

The present inventors have devoted themselves to carry out their investigations in order to solve the above described problems. Firstly, the present inventors have investigated a reason why adherence of the metal nanoparticle sintered product layer formed on a surface of the flat substrate is significantly reduced compared with adherence of a metal film layer being uniformly coated. For example, formation of a uniform silver film layer on a flat glass substrate by the use of a silver mirror reaction or the like results in a large contact area between the silver film layer and the substrate surface, and never results in stripping of the silver film layer even when a strain stress is applied to an interface between the silver film layer and the substrate surface because silver is excellent in its ductility. On the other hand, although a silver nanoparticle sintered product layer formed on a flat glass substrate densely coats a surface of the substrate from a macroscopic point of view, only bottom portions of discrete silver nanoparticles come into contact with the substrate surface from a microscopic point of view, so that the sum total of the contact areas becomes slight. The strain stress applied at an interface between the silver nanoparticle sintered product layer and a substrate surface tends to be concentrated in a region in which the bottom portions of the silver nanoparticles come into contact with the substrate surface, and consequently, stripping of the layer gradually proceeds from a region at which the above described contact area is smaller. Eventually, it has been proved that a part of the silver nanoparticle sintered product layer presenting on the substrate surface is completely stripped off.

In addition, after the sintered product layer is formed, oxidation of a surface of the silver nanoparticle proceeds while the layer is exposed in air. As for a contact region between a bottom portion of the silver nanoparticle and the substrate surface in which metal silver at the bottom portion of the silver nanoparticle initially comes into contact with the substrate surface, an oxide layer on a surface of the silver nanoparticle gradually extends to this interface, so that the contact area between the metal silver and the substrate surface is further decreased. Therefore, adherence of the silver nanoparticle sintered product layer to the substrate surface will be reduced with the passage of time.

On the other hand, when an underlying metal film layer is beforehand formed on a flat glass substrate before forming a silver nanoparticle sintered product layer on a surface of the underlying metal, a contact area per se between a bottom portion of the silver nanoparticle and the underlying metal surface remains small, but a contact force between metal and metal becomes larger than that between metal and glass. In addition, it has also found that adherence is further improved because sintering advances between the bottom portion of the silver nanoparticle and the underlying metal surface while performing a heat sintering treatment. Consequently, an effective contact area in which a flat surface of the glass substrate comes into contact with a bottom portion of the silver nanoparticle via the underlying metal film layer will be significantly increased.

The present inventors have further carried out the investigation based on the above described knowledge. Specifically, it has found that, when a metal compound is blended in the conductive metal paste in order to conduct the heat sintering treatment, metal contained in the metal compound can be reduced and then be precipitated out as a metal atom on a surface of the substrate. On the other hand, silver nanoparticles also come into contact with the surface of the substrate, so that the precipitated metal atoms fill a gap surrounding a contact region between the substrate surface and the silver nanoparticles, and subsequently cover the periphery portion thereof to form a film layer made of the precipitated metal. It is a matter of course that sintering and alloying also proceed between a surface of the silver nanoparticle and a film layer of the precipitated metal. Eventually, it is has been found that an effect of increasing the effective contact area which is equivalent to that in the case of forming the silver nanoparticle sintered product layer via the underlying metal film layer is heightened, and consequently, adherence of the silver nanoparticle sintered product layer is improved with respect to the substrate surface. It is a matter of course that the reaction in which metal contained in the metal compound is reduced and precipitated as a metal atom is a reaction proceeding in a solution, and this reaction rate becomes larger with the increase of temperature, and thus a sufficient reaction rate can be achieved even at a temperature of at least 250° C. to 350° C. A moving and diffusing velocity of the precipitated metal atom on a surface becomes larger, so that it is possible to rapidly fill the gap existing around a contact region between the substrate surface and the silver nanoparticle. Among metal compounds, which can experience the above described reduction reaction and which can also be solved uniformly in an organic solvent used as a dispersion solvent for a conductive metal paste, it is preferably available to use a metal compound containing organic anion species as well as metallic cation species such as a metal salt of organic acid comprising an organic anion species derived from organic acid or a complex compound of metal having an organic anion species as a ligand. In addition, although organic matter derives from the organic anion species upon reduction, these unnecessary organic matters can eventually be evaporated and removed at a temperature of about 250° C. to 350° C.

In addition to a series of the above described knowledge, the present inventors have accomplished the present invention by confirming that: the metal compound blended in the conductive metal paste, which is even at a low level of loadings, is concentrated near the substrate surface when the organic solvent evaporates during the heating treatment; and reduction of metal contained in the metal compound proceeds; and consequently the metal is selectively precipitated as a metal atom on the substrate surface.

That is, a conductive metal paste according to the present invention is:

a conductive metal paste available for forming a metallic thin film layer of a metal fine particle sintered product type on a surface of a substrate, characterized in that:

the conductive metal paste comprises metal fine particles having a fine average particle size dispersed uniformly in a dispersion solvent, one or more metal compounds, and an amine-based solvent capable of solving the one or more metal compounds;

the average particle size for the metal fine particles having a fine average particle size is selected within a range from 1 to 100 nm;

a surface of the metal fine particles is coated with one or more compounds having a group that contains a nitrogen, oxygen, or sulfur atom and is capable of coordinate bonding via a lone pair held by the atom, as a group capable of coordinate bonding with a metal element contained in the metal fine particles;

metal species contained in the one or more metal compounds are selected from the group consisting of metal species which exhibit adhesion to a material constituting a surface of the substrate;

the conductive metal paste comprises 10 to 60 parts by mass in total of the one or more compounds having a group that contains a nitrogen, oxygen, or sulfur atom with respect to 100 parts by mass of the metal fine particles;

the conductive metal paste comprises the one or more metal compounds such that a ratio of metals contained in the one or more metal compounds to 100 parts by mass of the metal fine particles is 0.3 to 7 parts by mass in total;

a blending ratio of the amine-based solvent capable of solving the one or more metal compounds is selected such that the amine-based solvent is within a range from 100 to 500 parts by mass per 10 parts by mass in total of the metals contained in the one or more metal compounds; and the conductive metal paste comprises, as the dispersion solvent, one or more organic solvents which can solve the one or more compounds having a group containing a nitrogen, oxygen, or sulfur atom and which can uniformly dilute a solution comprising the metal compound and the amine-based solvent capable of solving the metal compound as well.

In the above described case, it is preferable that the metal compound comprises an organic anion species and a cation species of the above described metal. Specifically, the above described metal compound comprising the organic anion species and cation species of the metal is desirably a metal salt of organic acid comprising an organic anion species derived from organic acid or a complex compound of the metal which has the organic anion species as a ligand.

For example, it is more preferable that the metal species contained in the one or more metal compounds is selected from the group consisting of copper and bismuth.

On the other hand, it is preferable that the metal species constituting the metal fine particles whose average particle size is selected in a range from 1 to 100 nm is a metal species selected from the group consisting of gold, silver, copper, platinum, palladium, rhodium, ruthenium, nickel, and aluminum, or an alloy of two or more thereof.

Further, it is more preferable that the average particle size for the metal fine particles having a fine average particle size is selected in a range from 5 to 20 nm.

It is preferable that a metal compound, which can be subjected to reduction of a metal species contained therein so as to provide the metal atom when heated up to a temperature selected in a range from 250° C. to 600° C., is selected as the one or more metal compounds used for the conductive metal paste according to the present invention.

In particular, it is more preferable that copper or bismuth is selected as a metal species which is contained in the one or more metal compounds, when a material constituting a surface of the substrate is a glass material.

The conductive metal paste according to the present invention has advantages as described below.

When the conductive metal paste according to the present invention is used, a heat treatment of the paste at a temperature selected in a range from 250° C. to 600° C., for example, results in formation of a sintered product layer of metal fine particles whose average particle size is selected in a range from 1 to 100 nm, which are contained as conductive media in the paste, and thus formed layer can be used as a good conductive thin film layer. In addition, metal species contained in the blended metal compound is reduced upon the heat treatment, and thus metal atoms are precipitated, and consequently the precipitated metal atoms are accumulated at an interface between the underlying substrate surface and the metal fine particle sintered product layer, and thereby forming a metal film layer which improves adherence between the underlying substrate surface and the metal fine particle sintered product layer. Therefore, use of the conductive metal paste according to the present invention allows for fabrication of a metal fine particle sintered product layer which exhibits excellent adhesion to the underlying substrate surface and which has a good conductive performance. This excellent adhesion to the substrate surface can be achieved without using a binder resin, and means for improving the adhesion can favorably be applied at a wide range of heat treatment temperatures. In other words, selection of a heat treatment temperature depending on the intended underlying substrate materials allows for fabrication of a metal fine particle sintered product layer, which exhibits excellent adhesion as well as having a good conductive performance, on an underlying substrate made of various materials. In addition, a metal compound used as the above described "means for improving adherence" is blended in the conductive metal paste, and thus formation of a sintered product and production of a precipitated metal film used as "means for improving adherence" are performed in the same heat treatment step, thereby allowing for avoidance of process complications. Further, utilization of means for printing and applying a conductive paste which contains metal fine particles having an extremely fine particle size allows a conductive layer of a sintered product type having a fine patterning shape to conveniently be fabricated at a high reproducibility and efficiency by the use of screen printing, ink jet printing and the like.

BEST MODE FOR CARRYING OUT THE INVENTION

A conductive metal paste according to the present invention will now be described in detail.

A conductive metal paste according to the present invention is intended to be in a form of a paste-like dispersion solution comprising metal fine particles having a fine average particle size uniformly dispersed in a dispersion solvent, one or more metal compounds, and an amine-based solvent which can solve the one or more metal compounds as essential components.

As for the conductive paste according to the present invention, a surface coated with one or more compounds containing the metal fine particles is coated with one or more compounds having a group containing a nitrogen, oxygen, or sulfur atom as a group capable of coordinate bonding with the metal element, in order to hold the metal fine particles having an average particle size selected in a range from 1 to 100 nm which are contained as conductive media in a dispersion solvent in a uniformly dispersed state. As a compound used as a coating molecule layer for keeping the above described dispersibility, it is preferable to use an organic compound having an amino group (—$NH_2$), a hydroxyl group (—OH), or a sulfanyl group (—SH) at an end thereof or alternatively having ether (—O—) or sulfide (—S—) within the molecule, which is excellent in its affinity for the dispersion solvent to be used. Although these dispersing agents form a molecule layer for coating a surface coated with one or more compounds containing the metal fine particles to improve the dispersibility, it is preferable that these dispersing agents never interfere with contact between surfaces of the metal fine particles during a burning step ultimately. That is, if a heat treatment at a temperature of 200° C. or higher is performed for example, it is preferable to use a substance which is easily separated from a surface coated with one or more compounds containing the metal fine particles and has a boiling point within a certain region where this substance can eventually be evaporated and removed.

A representative of the available compounds having an amino group is alkylamine. It is preferable to use alkylamine which keeps its coordinate bonding with the metal element without being detached therefrom in an ordinary storage environment, particularly in a range less than 40° C., and at the same time, it is also preferable to use alkylamine whose boiling point is in a range of 60° C. or higher, and preferably in a range of 100° C. or higher. However, it is necessary to be able to rapidly separate alkylamine from a surface coated with one or more compounds containing the metal fine particles when performing a low-temperature sintering treatment, and therefore, it is preferred to, at least, use such an alkylamine that has a boiling point being in a range not exceeding 300° C., usually, being within a range of 250° C. or lower. For example, alkylamine whose alkyl group has C4 to C20 is used, and more preferably the alkyl group is selected to have C8 to C18, and alkylamine having an amino group at the end of an alkyl chain is used. For example, alkylamine within the above described range of C8 to C18 is thermally stable, and a vapor pressure of such alkylamine is not so high, and further it is easy to maintain and control a percentage content within a desired range when storing at a room temperature or the like, so that this kind of alkylamine is favorably used in terms of its handleability. Generally, although it is preferable that alkylamine of a primary amine type is used when a coordinate bond as described above is formed because such alkylamine exhibits a higher binding capacity, it is also possible to use a compound of a secondary amine type as well as of a tertiary amine type. In addition, it is also possible to use a compound in which two or more of adjacent amino groups are involved in the bonding, such as a compound of a 1,2-diamine type or of a 1,3-diamine type. Further, it is also possible to use polyoxyalkyleneamine. In addition, it is also possible to use a compound having a hydrophilic end group in addition to a terminal amino group, for example hydroxyamine which has a hydroxyl group, such as ethanol amine.

In addition, a representative of compounds having an available sulfanyl group (—SH) is alkanethiol. As for the above described alkanethiol, it is preferable to use alkanethiol which keeps its coordinate bonding with the metal element without being detached therefrom in an ordinary storage environment, particularly in a range less than 40° C., and at the same time, it is also preferable to use alkanethiol whose boiling point is in a range of 60° C. or higher, and preferably in a range of 100° C. or higher. However, it is necessary to be able to rapidly separate alkanethiol from a surface coated with one or more compounds containing the metal fine particles when performing a low-temperature sintering treatment, and therefore, it is preferable to use such an alkanethiol that has a boiling point being in a range not exceeding 300° C., usually, being within a range of 250° C. or lower. For example, alkanethiol whose alkyl group has C4 to C20 is used, and more preferably the alkyl group is selected to have C8 to C18, and alkanethiol having a sulfanyl group (—SH) at the end of an alkyl chain is used. For example, alkanethiol within the above described range of C8 to C18 is thermally stable, and a vapor pressure of such alkanethiol is not so high, and further it is easy to maintain and control a percentage content within a desired range when storing at a room temperature or the like, so that this kind of alkanethiol is favorably used in terms of its handleability. Generally, although it is preferable that alkanethiol of a primary thiol type is used because such alkanethiol exhibits a higher binding capacity, it is also possible to use a compound of a secondary thiol type as well as of a tertiary thiol type. In addition, it is also possible to use a compound in which two or more sulfanyl groups (—SH) are involved in the bonding, such as a compound of a 1,2-dithiol type or the like.

In addition, a representative of compounds having an available hydroxy group is alkanediol. As for the above described alkanediol, it is preferable to use alkanediol which keeps its coordinate bonding with the metal element without being detached therefrom in an ordinary storage environment, particularly in a range less than 40° C., and at the same time, it is also preferable to use alkanediol whose boiling point becomes in a range of 60° C. or higher, and preferably in a range of 100° C. or higher. However, it is necessary to be able to rapidly separate alkanediol from a surface coated with one or more compounds containing the metal fine particles when performing a low-temperature sintering treatment, and therefore, it is preferable to use such an alkanediol that has a boiling point being in a range not exceeding 300° C., usually, being within a range of 250° C. or lower. For example, it is more preferable to use a compound in which two or more hydroxy groups are involved in the bonding, such as a compound of a 1,2-diol type or the like.

That is, a surface of the metal particle contained in the conductive metal paste of the present invention includes a nitrogen, oxygen, or sulfur atom as a group capable of coordinate bonding with a metal element contained in the above described metal particle and is coated with one or more compounds having a group capable of coordinate bonding via a lone pair held by the atoms, however, it is preferable that the surface is coated with one or more amine compounds having one or more terminal amino groups for example. For example, when the conductive metal paste is prepared, 5 to 60 parts by mass in total of the one or more amine compounds are intended to be contained with respect to 100 parts by mass of the metal fine particles. Preferably, 7 to 40 parts by mass in total of the one or more amine compounds, and more preferably 10 to 30 parts by mass in total of the one or more amine compounds are contained with respect to 100 parts by mass of the metal fine particles.

A first function of the amine compound contained in the conductive metal paste of the present invention is to form an applying layer on a surface coated with one or more compounds containing the metal fine particles, and to prevent bulk formation which is due to direct contact between clean surfaces of the metal fine particles and adherence thereof in a step of adding, stirring, and mixing metal compounds and the amine-based solvent therefor in a process of preparing the conductive metal paste at a room temperature. Therefore, although there are no specific limitations on varieties of the above described compounds as long as an applying layer is formed on a surface coated with one or more compounds containing the metal fine particles, it is preferable to use a compound which does not easily evaporate at a room temperature. Therefore, it is preferable that the above described amine compound having an amino group at the end thereof, such as alkylamine, is used. More specifically, alkylamine whose alkyl group has C4 to C20 is used, and more preferably the alkyl group is selected to have C8 to C18, and alkylamine having an alkyl group at the end of an alkyl chain is used. For example, alkylamine within the above described range of C8 to C18 is thermally stable, and a vapor pressure of such alkylamine is not so high, and further it is easy to maintain and control a percentage content within a desired range when storing at a room temperature or the like, so that this kind of alkylamine is favorably used in terms of its handleability. In order to perform the first function of forming the applying layer on a surface coated with one or more compounds containing the metal fine particles, a percentage content of the amine compound having an amino group at the end thereof such as alkylamine should be selected as appropriate depending on an entire surface coated with one or more compounds containing the metal fine particles and also in consideration of varieties of metals and of amine compounds such as varieties of alkylamines for example. Generally, if alkylamine having C8 to C18 is used, a specific gravity of metal per se is about the same as that of the above described silver, gold, or copper, and an average particle size of metal fine particles is not extremely smaller than 10 nm, and then an amount of alkylamine to be used in a dispersion solution containing colloidal metal fine particles is preferably selected in a range from 5 to 60 parts by mass, and preferably 7 to 40 parts by mass, and more preferably 10 to 30 parts by mass with respect to 100 parts by mass of the metal fine particles, depending on varieties of metals and particle sizes of metals. If amine compounds other than alkylamines are used, it is also preferable that a total amount of the amine compounds is selected in a range from 5 to 60 parts by mass, and preferably 7 to 40 parts by mass, and more preferably 10 to 30 parts by mass with respect to 100 parts by mass of the metal fine particles.

In addition, a thickness of the above described molecule layer which coats the metal fine particles does not depend on an average particle size of the metal fine particles and is required to be at the same level. Therefore, a total amount of a compound, which has a group containing any of a nitrogen atom, an oxygen atom, or a sulfur atom as a group capable of coordinate bonding with the metal element, used for forming the molecule layer which coats the metal fine particles is increased since a sum of a surface area of the metal fine particles per mass unit of the metal fine particles is increased when the average particle size of the metal fine particles becomes smaller. That is, it is desirable that a sum of a compound which has a group containing any of a nitrogen atom, an oxygen atom, or a sulfur atom as a group capable of coordinate bonding with the metal element is inversely increased or decreased with the average particle size of the metal fine particles to be used.

On the other hand, according to the present invention, reduction of the metal species contained in the metal compound blended into the conductive metal paste is carried out concurrently with heating and firing the metal fine particles, thereby precipitating the metal species on a surface of the substrate as a metal atom. That is, as the metal compound blended into the conductive metal paste according to the present invention, a metal compound is selected which is capable of producing a metal atom by reducing a metal ion species contained in the metal compound during heating thereof at a temperature selected in a range from 250° C. to 600° C. preferably. This metal compound being in a form dissolved in a solvent is also allowed to uniformly mix with the metal fine particles dispersed in the conductive metal paste. That is, use of a metal compound comprised of an organic anion species and a metal cation species for example as the above described metal compound easily permits dissolution into the solvent. Specifically, it is preferable that the metal compound comprising the organic anion species and the metal cation species is in the form of a metal salt of organic acid comprised of an organic anion species derived from organic acid or a complex compound of the above described metal having an organic anion species as a ligand.

In this case, an anion species capable of forming the metal salt of organic acid or the complex compound of the metal having the organic anion species as a ligand, such as carboxylate (—COO$^-$) derived from carboxylic acid or 2,4-pentanedionate ([$CH_3COCHCOCH_3$]$^-$) derived from acetyl acetone ($CH_3COCH_2COCH_3$) is used as the above described organic anion species. A metal cation species whose oxidation number is 2 or more and these metal salt of organic acid and the organic complex compound of the metal are usually capable of dissolving into the organic solvent without causing ionic dissociation. That is, carboxylate (—COO$^-$) derived from carboxylic acid or 2,4-pentanedionate ([$CH_3COCHCOCH_3$]$^-$) derived from acetyl acetone ($CH_3COCH_2COCH_3$) are coordinated with a central metal cation species as a bidentate ligand. In this case, the metal salt or the complex compound as described above are dissolved in the organic solvent in the form of a complex compound including a plurality of the binentate ligands near at room temperature, generally without ion dissociation.

For example, most of the metal cation species whose oxidation numbers are 2 exhibit hexacoordination, and have two bidentate ligands adjacent to each other such as carboxylate (—COO$^-$) derived from carboxylic acid or 2,4-pentanedionate ([$CH_3COCHCOCH_3$]$^-$) derived from acetyl acetone ($CH_3COCH_2COCH_3$), and in addition, the remaining two coordination sites surrounding the metal cation species are occupied by organic solvent molecules capable of being solvated. In a metal cation species whose oxidation number 3, three bidentate ligands as descried above are coordinated around the metal cation species. In this state, a hydrocarbon chain portion such as carboxylate (—COO$^-$) derived from carboxylic acid or 2,4-pentanedionate ([$CH_3COCHCOCH_3$]$^-$) derived from acetyl acetone ($CH_3COCH_2COCH_3$) can be dissolved in the organic solvent.

Metal species contained in the metal compound is reduced by performing a heat treatment, and precipitated as a metal atom on a surface of the substrate or of the metal fine particle. The metal atoms precipitated on the surface of the substrate or of the metal fine particles diffuse and move on the surface, and firstly are filled on a gap portion existing around a contact region between the metal fine particles and the substrate surface. While the gap portion is filled with the precipitated metal atoms, a metal film layer comprising the precipitated metal atoms is formed around the gap portion on the substrate surface. Specifically, although the metal compound is uniformly dissolved in an organic solvent which is used for a disperse solvent constituting the conductive metal paste, the organic solvent is gradually evaporated from a surface of a coating film of the conductive metal paste by the heat treatment, and the process of concentration proceeds. During the process of concentration, a liquid phase containing the metal compound is accumulated near the substrate surface, and eventually, the gap portion existing around the contact region between the metal fine particles and the substrate surface as well as a surface of the substrate around the gap portion are coated with a metallic thin film comprised of the precipitated metal atoms. The metal film layer has a form of covering both a surface of the substrate and a surface coated with one or more compounds containing the metal fine particles, and thus considering the contact region existing via the metal film layer which covers the substrate surface, an effective contact area at the contact region between the metal fine particles and the substrate surface stands comparison with the case in which an underlying metal film layer is beforehand provided.

It is a matter of course that a metal species contained in the metal compound is selected from the group consisting of metal species which exhibit adhesion to a material constituting the substrate surface with which the metal film layer comes into contact. With respect to a surface of a silica glass substrate, it is possible to favorably use copper, bismuth (melting point: 271.44° C.) or the like. Further, when using a substrate comprising a glass material being doped with various elements, it is generally possible to use, as a metal which exhibits adhesion, a metal element which is added to the glass material, for example, metal species such as bismuth and antimony of the fifteenth group elements (melting point: 630.7° C.) and tellurium of the sixteenth group element (melting point: 449.8° C.) or metal species belonging to the same group as these metal elements in a long-periodic table. In addition, with respect to $SiO_2$ which is a main component of glass, it is generally possible to use metal elements belonging to the same fourteenth group element as the silicon element, tin (melting point: 231.97° C.), lead (melting point: 327.5° C.) or the like as a metal which exhibits adhesion to the glass material. In addition, when providing on a flat glass surface a film layer which comprises metal atoms uniformly precipitated, it is possible to use, as a metal which exhibits excellent adherence, a metal species being excellent in its ductility like silver, gold, and copper.

The metal species contained in the metal compound is intended to be in the form of a metal cation species, and specifically, it is preferable to use a cation species having a oxidation number capable of forming a salt with a plurality of organic anion species or complex compounds having a plurality of organic anion species as ligands, among variable cation species having a plurality of possible oxidation numbers. For example, a bivalent cation species $Cu(II)^{2+}$ can favorably be used when copper is used, while a bivalent cation species $Bi(II)^{2+}$ can favorably be used when bismuth is used.

For example, a transition metal compound in which two ligands such as carboxylate (—COO$^-$) derived from carboxylic acid or 2,4-pentanedionate ([$CH_3COCHCOCH_3$]$^-$) are coordinated with $Cu(II)^{2+}$ is partially reduced upon a heat treatment as described in the following reaction formula: $Cu(II)^{2+}+e\rightarrow Cu(I)^+$, and then causes disproportionation of the oxidation numbers between the two compounds to produce a metal Cu atom as described in the following reaction formula: $2Cu(I)^+\rightarrow Cu+Cu(II)^{2+}$. On the other hand, $Cu(II)^{2+}$ thus derived is partially reduced within the system to be converted into $Cu(I)^+$ again. These reactions proceed in a chain reaction manner during the heat treatment, and metal atoms are precipitated on surfaces of the substrate and of the metal fine particles being in contact with the liquid phase. On the other hand, in the liquid phase, the produced metal atoms are coagulated so as to prevent newly producing fine metal fine particles, and the blended metal compound is mainly consumed during precipitating the metal atoms on surfaces of the substrate and of the metal fine particles being contact with the liquid phase.

If a metal species constituting the metal fine particles is a base metal, and energy $\Delta E_2$ required for a metal cation species contained in the metal compound to be partially reduced is smaller than energy $\Delta E_1$ which is released during the oxidation of a metal species constituting the metal fine particles to a monovalent metal cation species compared with metal species contained in the blended metal compound, and then oxidation of the metal species constituting the metal fine particles is caused during the partial reduction of the metal cation species contained in the metal compound. This phenomenon should be avoided for the conductive metal paste according to the present invention, and a combination in which a metal species contained in the blended metal compound becomes a base metal compared with a metal species constituting the metal fine particles is generally selected.

A metal atom (M) produced from the metal compound is immobilized in the form of Si—O-M to a silanol structure (Si—OH) portion existing on a substrate surface such as a glass substrate surface. Further, on a glass substrate surface for example, a metal film layer for coating the substrate surface is grown by using, as a core, a metal atom immobilized in the form of Si—O-M. Therefore, the metal film layer coating the substrate surface includes a region which contacts with an element species having a high electronegativity existing on the substrate surface, and exhibits an excellent adhesion. In addition, in a region in which metal fine particles come into contact with the metal film layer coating the substrate surface, the metal film layer is also partially formed on a surface coated with one or more compounds containing the metal fine particles, so that a bond between the same kinds of metal atoms exists between the metal film layer and the metal fine particle. Combined with the above described contribution, it is provided a high adhesion characteristic induced by interposition of the metal film layer between the substrate surface and the metal fine particle.

Further, if an oxide layer is remained on an extremely small portion of a surface coated with one or more compounds containing the metal fine particles, a metal atom produced upon the above described reduction reaction also has a function of reducing the oxide layer of the surface coated with one or more compounds containing the metal fine particles provided that this metal atom is a base metal compared with the metal elements constituting the metal fine particle. Therefore, the surface coated with one or more compounds containing the metal fine particles becomes a state in which a clean metal surface is exposed, and can form a good intermetallic junction with respect to a metal film layer coating the substrate surface by using as a core a metal atom which is immobilized in the form of Si—O-M on a glass substrate surface for example. In addition, although a metal oxide molecule of the base metal element is derived with the progress of an oxidation-reduction reaction between the above described metal oxide of a noble metal element and the base metal element, this molecule reacts again with an acid compound derived from the organic anion species in the original metal compound to be re-converted into the metal compound. Consequently, production of the metal oxide is substantially avoided during reduction reaction to the metal compound within a liquid phase containing an amine-based solvent.

A series of reactions proceeding in a liquid phase as described above, as for a metal compound thus used, proceed in a liquid phase comprising an amine-based solvent and an organic solvent used for a diluent solvent, and also proceed near an interface between the substrate surface and the metal fine particle coating layer at which the metal compound is concentrated. In other words, it becomes possible to intensively use a metal compound added to the conductive metal paste according to the present invention near the interface between the targeted substrate surface and the metal fine particle coating layer.

On the other hand, a phenomenon of mutually coagulating the metal fine particles occurs depending on metal atoms to be produced, during reduction reaction against a metal species contained in the blended metal compound even under the low-temperature condition, while storing the conductive metal paste according to the present invention, In the present invention, the blended metal compound is selected such that a reduction reaction against a metal species contained in the metal compound proceeds at a temperature of 250° C. or higher and never proceeds at a storage temperature, specifically at a temperature of 50° C. or lower. In addition to this, metal fine particles per se are also intended to be in the form of keeping a coating molecule layer on a surface thereof. Use of these two means in the conductive metal paste according to the present invention effectively inhibits the formation of agglomerated particles having large particle sizes in which metal fine particles contained in the paste are mutually agglomerated. Consequently, a sintered product layer of the metal fine particles fabricated by using the conductive metal paste according to the present invention is obtained by sintering the above described layer in which dispersed metal fine particles are densely stacked rather than in which agglomerated particles partially having large particle sizes are mixed. Therefore, a surface coated with one or more compounds containing the metal fine particles sintered product layer thus obtained becomes extremely excellent in its evenness, and simultaneously a sintering strength of the entire layer also becomes excellent with the increase in densification of the sintered product layer.

The metal compound blended in the conductive metal paste according to the present invention provides, in many cases, precipitation of metal atoms on surfaces of the substrate and of the metal fine particles being in contact with a liquid phase and is consumed during forming a metal film layer partially covering a periphery of a contact region between the contact surface and the metal fine particles, however, some of the metal fine particles mutually contact with each other to form a metal film as well even in a region in which sintering is occurred. Considering the above description, it is desirable that a blending ratio of one or more metal compounds is selected in a range from 0.3 to 7 parts by mass in total of metals contained in the one or more compounds, and preferably in a range from 0.4 to 5 parts by mass, and more preferably in a range from 0.5 to 3 parts by mass with respect to 100 parts by mass of the metal fine particles contained in the conductive metal paste according to the present invention.

In addition, when the metal compound is dissolved in an organic solvent used as a disperse solvent of the conductive metal paste according to the present invention, it is preferable that an anion species capable of forming a metal salt of organic acid or a complex compound of a metal having an organic anion species as a ligand is coordinated with the metal ion species, and that the remaining coordination sites are occupied by organic solvent molecules capable of solvation. Generally, the organic solvent used as the disperse solvent is poor in a function as the organic solvent molecule capable of solvation which occupies the remaining coordination sites with respect to the metal ion species. Therefore, an amine-based solvent is used as the organic solvent molecule capable of salvation by being weakly coordinated with the metal cation species contained in the above described metal compound. As for this amine-based solvent, metal species contained in the metal compound are partially reduced, and this solvent also has a function as the organic solvent molecule which further solvates with respect to a metal cation species whose oxidation number is decreased. From this point of view, an adequate amount of the amine-based solvent which is capable of solving the one or more metal compounds is added thereto depending on varieties of metal species among one or more metal compounds to be used. Specifically, it is desirable that a blending ratio of the above described amine-based solvent to the one or more metal compounds is selected in a range from 100 to 500 parts by mass, and preferably in a range from 150 to 480 parts by mass per 10 parts by mass in total of metals contained in the one or more metal compounds.

Usually, the metal compound to be blended is once dissolved in the amine-based solvent in the above described blending ratio, and then a predetermined amount of this metal compound solution is mixed in the conductive metal paste according to the present invention. In this case, the amine-based solvent capable of solving the above described metal compound is dissolved with the metal compounds in the organic solvent contained in the conductive metal paste of the present invention in the form of being solvated in the metal compound. Therefore, it is required that the amount of the amine-based solvent to be used is selected to be at a significantly higher level compared with an amount at which the metal compound is dissolved at a saturated solubility thereof in the amine-based solvent. When a solution of the metal compound is prepared for example, an amount of the amine-based solvent can be selected in a range from 100 to 300 parts by mass per 10 parts by mass in total of metals contained in one or more metal compounds.

Accordingly, it is preferable that the amine-based solvent used for the conductive metal paste of the present invention is excellent in its ability to solubilize the metal compounds to be used, and has a boiling point within a range of at least 150° C. or higher and 300° C. or lower. In addition, the amine-based solvent carries out a function of providing solubility when the metal compound is uniformly dissolved in the organic solvent to be used for the conductive metal paste of the present invention, so that the amine-based solvent is also required to exhibit an adequate affinity for the above described organic solvent. A melting point of the amine-based solvent per se is not required to be at a room temperature or less since this amine-based solvent is eventually mixed into the organic solvent which acts as a diluent solvent, however, it is preferable that the melting point never exceeds 50° C. when preparing a solution in which a metal compound to be blended beforehand is once dissolved in the amine-based solvent at the above described blending ratio. Examples of the favorable amine-based solvents satisfying these conditions include alkyl amine, polyamine and the like having high boiling points, such as N,N-dibutylaminopropylamine (boiling point 238° C.) and N,N-diethylaminopropylamine (boiling point 159° C.) for example.

Therefore, the organic solvent contained in the conductive metal paste of the present invention has a function as a dispersion solvent when preparing a dispersion liquid in which metal fine particles having the above described coating molecule layers are uniformly dispersed. This organic solvent is also used as a diluent solvent when a metal compound to be blended and an amine-based solvent are uniformly mixed with each other. Therefore, it is possible to use a single organic solvent as long as this organic solvent is available for these two kinds of applications, and also a mixed-type solvent in which two or more organic solvents having compatibilities are uniformly mixed. Although varieties of the solvents should not be limited as long as the solvent is available for the above described applications, it is preferable to select a non-polar solvent or a low-polar solvent rather than to select a high-polar solvent which has a significantly high ability to solubilize a compound, for example an amine compound such as alkyl amine, for forming an applying layer on a surface coated with one or more compounds containing the metal fine particles and allows the applying layer on the surface of the metal fine particle to disappear.

In addition, it is preferable that the organic solvent for the dispersion solvent has a thermal stability to the extent that pyrolysis never occurs even at a temperature at which a heat treatment is performed when the conductive metal paste of the present invention is actually utilized. Moreover, when metal atoms are precipitated from metal species contained in the blended metal compound by a reduction reaction, the organic solvent also has a function as a reaction solvent in order to induce the above described reaction. Further, it is necessary to keep the conductive metal paste within a range of desired liquid viscosity during a coating process when fine lines are formed, so that it is preferable to use a non-polar solvent or a low-polar solvent having a relatively high boiling point, such as terpineol, mineral spirit, tetradecane, or dodecane, which is not easily evaporated near room temperature when forming the fine lines, considering a handleability of the paste.

When a metal fine particle sintered product layer is formed on a surface of a substrate by the use of the conductive metal paste of the present invention, following a heat treatment, a compound which forms an applying layer on a surface of metal fine particles is separated away, and evaporation of an organic solvent of a dispersion solvent proceeds, and consequently a low-temperature sintering also proceeds among the metal fine particles. In this case, a gap between the metal fine particles densely stacked on each other is filled with a solution containing the metal compound which is dissolved in the organic solvent with the aid of an amine-based solvent. Specifically, the metal fine particles in the form of being dispersed in the organic solvent is initially applied to a surface of the substrate, and then evaporation of the organic solvent and separation of the compound which forms the applying layer on a surface coated with one or more compounds containing the metal fine particles are gradually proceeded upon initiation of the heat treatment. The metal compound contained therein has a boiling point significantly higher than that of the organic solvent and can not be evaporated, while the amine-based solvent which exhibits high affinity for the metal compound also provides boiling point elevation by the same mechanism as described above, and thus evaporation of the amine-based solvent is inhibited. Consequently, a liquid phase in which the metal compound and the amine-based solvent are concentrated is remained in a narrow gap space between the metal fine particles densely stacked on each other, and a rate of the reduction reaction against the metal compound is accelerated with the increase of a concentration. In this state on the substrate surface, metal atoms produced by the reduction reaction against the metal compound is immobilized in the form of Si—O-M to a silanol structure (Si—OH) portion existing on a surface of a substrate, for example a surface of a glass substrate, and then precipitation and fixation of the metal atoms produced by the reduction reaction are sequentially proceeded by the use of two-dimensionally configured metal atoms as a core, thereby forming an extremely thin metal film layer. On the other hand, also in the case of the metal fine particles existing in close proximity to a surface of the substrate, the metal atoms produced from the reduction reaction are precipitated on a surface coated with one or more compounds containing the metal fine particles existing in proximity to the interface, thereby forming a region in which metal atoms are partially precipitated in the form of a film. Although a narrow gap portion exists near the interface between the substrate surface and the metal fine particles being in contact therewith, this narrow gap portion will then be filled so as to connect a metal film layer on the substrate surface with a metal film layer on a surface coated with one or more compounds containing the metal fine particles. A reaction which proceeds in the vicinity of the interface is proceeded while keeping a concentration of the amine-based solvent in the liquid phase at a high level with the progress of concentration. Therefore, even when oxygen molecules are included in an ambient atmosphere, an effect of the oxygen molecules is eliminated since the narrow gap between the metal fine particles is filled with the liquid phase. At the time when the heat treatment is completed, evaporation of the organic solvent as well as the amine-based solvent contained in the coating molecule compound which coats a surface coated with one or more compounds containing the metal fine particles is also completed. In addition, unlike the metal compound, a boiling point of the organic compound derived from organic anion species contained in the metal compound is not so high in general, and thus evaporation of this organic compound is also completed as well.

If the heat treatment is continued in an atmosphere including oxygen molecules after completing evaporation of a solvent component contained in the conductive paste according to the present invention, oxidation of the metal fine particle sintered product layer as well as the metal film layer formed on the substrate surface is initialized, so that it is not desirable to set a heat treatment time longer than necessary. The heat treatment can also be carried out in an inert gas atmosphere, during which the above described oxidation is avoided. Generally, a targeted film thickness of the metal fine particle sintered product layer fabricated by the use of the conductive paste according to the present invention is about 1 μm to 10 μm as described below, and an amount of the conductive paste to be coated per unit area is not so much. Even in the above described case, it becomes possible to sufficiently achieve an effect of improving adhesion between the substrate surface and the metal film layer, by adding the metal compound and the amine-based solvent in the above described ratio to the metal fine particles contained in the paste.

On the other hand, a fine wiring pattern fabricated by using the conductive paste according to the present invention is preferably a fine pattern whose minimum line width and a space between the lines are respectively 5 to 200 μm, and a film thickness of the dense metal fine particle sintered product layer fabricating this pattern is selected depending on the above described minimum line widths. That is, a targeted average film thickness of the dense metal fine particle sintered product layer is in a range from $1/10$ to $1/2$ of the minimum line width when the minimum line width is in a range from 5 to 50 μm, and is in a range from $1/100$ to $1/20$ of the minimum line width when the minimum line width is in a range from 50 to 200 μm. The targeted average film thickness of the dense metal fine particle sintered product layer is, in many cases, selected in a range from 1 μm to 10 μm. In addition, in order to achieve high controllability and reproducibility of the film thickness with respect to the above described average film thickness, an average particle size of the metal fine particles to be used is selected to be, at most, at $1/5$ or less of the targeted average film thickness, and usually $1/10$ or less thereof, for example in a range from 2 to 50 nm. In order to form a denser sintered product layer, it is preferable that the average particle size of the metal fine particles is selected in a range from 5 to 20 nm.

As for the fine wiring pattern in which the conductive paste according to the present invention is used to fabricate thereof, an electrical conductivity (resistance) of the entire sintered product of the metal fine particles used for the conductor layer is principally controlled by resistance between surfaces on which respective metal fine particles come in contact with each other which allows for achievement of favorable electrical contact between the metal fine particles. On the other hand, conductivity of each metal fine particle per se is a minor factor. Thus, metal fine particles whose clean metal surface is exposed and whose average particle size is 100 nm or less provide completion of dense fusing and sintering as a result of the nano-size effect thereof. That is, on a surface of the nano-size particulate, dense fusing and sintering on surfaces between the metal fine particles are allowed to be completed during the low-temperature sintering treatment, by the use of a phenomenon in which surface diffusion and migration of the metal atoms actively proceed at a relatively low temperature. When an average particle size of the metal nanoparticle is 100 nm or less, for example an average particle size of the metal nanoparticle is 5 to 20 nm, in order to use this mechanism, metal elements to be used are not specifically limited as long as the low-temperature sintering treatment efficiently proceeds even at a temperature of 300° C. or lower.

On the other hand, when the metal fine particle sintered product layer thus fabricated is used for a wiring layer on a wiring substrate which is used at a time of implementing various electronic parts, it is preferable to select a metal element such that a metal species per se constituting the metal fine particles has an excellent conductive characteristic. In some cases, it is also possible to use metal fine particles composed of an alloy material including two or more metal species, instead of using metal fine particles composed of a single metal element. For example, it is preferable that a metal species constituting the metal fine particle is a metal species selected from the group consisting of gold, silver, copper, platinum, palladium, rhodium, ruthenium, nickel, and aluminum, or an alloy of two or more of these species. It is particularly preferable to select a metal species excellent in its ductility and conductivity, specifically to select any of gold, silver, copper, platinum and palladium as a metal species constituting the metal fine particle.

On the other hand, the conductive metal paste containing the metal fine particles to be used is desirably prepared so as to have an adequate liquid viscosity depending on lithography techniques to be employed. For example, if a screen printing method is used for drawing a fine wiring pattern, the conductive metal paste containing the metal fine particles is desirably selected such that the liquid viscosity thereof is in a range from 50 to 200 Pa·s (25° C.). On the other hand, if an ink jet printing method is used, the liquid viscosity is desirably selected in a range from 5 to 30 mPa·s (25° C.). The liquid viscosity of the conductive metal paste containing the metal fine particles is determined depending on average particle sizes and dispersion concentrations of the metal fine particle to be used and on varieties of dispersion media being used, and thus the liquid viscosity can be adjusted to a targeted level by selecting the above described three factors as appropriate.

Even when using any of the screen printing method and the ink jet printing method, an average thickness of a dispersion coating layer to be graphically drawn is required to be selected in a range of $1/5$ to $1/1$ of the minimum line width if the minimum line width of the fine pattern to be drown is in a range from 5 to 50 μm. Therefore, it is rational that an average film thickness of the dense metal fine particle sintered product layer to be eventually obtained is selected in a range of $1/10$ to $1/2$ of the minimum line width which is selected in a range from 5 to 50 μm, considering aggregation and contraction following evaporation and sintering of the dispersion solvent contained in the coating layer.

For example, when a ceramics material substrate or a glass substrate being excellent in its heat resistance is used, it becomes possible to fabricate, conveniently or with high workability and reproducibility, a metallic thin film comprised of a dense metal fine particle sintered product layer having fine patterns on a surface such as a flat glass substrate after selecting a sintering treatment temperature in a range from 250° C. to 600° C. For example, an available fine pattern is a fine wiring pattern whose line width and a space between the lines are respectively 5 to 200 μm, and in this case, a thickness of a metal pad comprised of the dense metal fine particle sintered product which is formable can be selected in a range from 1 μm to 20 μm, and preferably in a range from 2 to 20 μm. In addition, a specific resistance value of the dense metal fine particle sintered product layer is also in a range which is available as a metallic thin film layer having a low resistance, and this value is at least $5 \times 10^{-6}$ Ω·m or less for example.

EXAMPLES

The present invention will now be described in detail with reference to examples below. These examples are representatives of the best mode of the present invention, however, the present invention should not be limited by these examples.

Example 1

Acetylacetonate Complex of Copper (II)

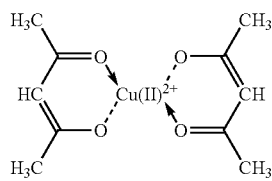

[formula 1]

An amine solution containing bis(2,4-pentadionate)Cu(II) presented above is prepared in accordance with the following procedure.

Ten grams of bis(2,4-pentadionate)Cu(II) (molecular weight 261.76; Tokyo Chemical Industry), 50 g of N,N-dibutylaminopropylamine (boiling point 238° C.; Koei Chemical), 50 g of toluene (boiling point 110.6° C.), and methanol (boiling point 64.65° C.) are heated to 60° C. for 30 minutes with stirring, thereby dissolving bis(2,4-pentadionate)Cu(II) in this mixed solvent. From this solution, toluene and methanol are distilled out by the reduced-pressure distillation.

The solution after the above described distillation becomes a solution having a green color, whose weight is 60 g, and also becomes an amine solution of bis(2,4-pentadionate)Cu(II). A content ratio of Cu in this solution is 4.06% by mass.

A commercially available dispersion liquid of silver ultra-fine particles (brand name: independent dispersion ultra-fine particle (Dokuritsu Bunsan Chou-biryushi) Ag1T: manufactured by ULVAC Materials (Shinku Yakin)), specifically a dispersion liquid of silver fine particles having an average particle size of 5 nm which comprises 35 parts by mass of silver fine particles, 7 parts by mass of dodecylamine (molecular weight 185.36, boiling point 248° C.) as alkylamine, and 58 parts by mass of toluene (boiling point 110.6° C.) as an organic solvent is used to carry out the following treatment, thereby preparing a stock dispersion liquid of silver nanoparticles.

To a 1 L recovery flask in which 500 g of the above described commercially available dispersion liquid of silver ultra-fine particles Ag1T (containing 35 wt % of Ag) is contained, 87.5 g of N,N-dibutylaminopropylamine (boiling point 238° C.: manufactured by Koei Chemical) (50% by mass with respect to Ag solids) and 52.5 g of dipropyleneglycol (30% by mass with respect to Ag solids) are added and mixed, and then heated to 80° C. for 1 hour with stirring. After completing the stirring, vacuum concentration is carried out to perform desolvation of toluene contained in Ag1T.

A mixture after the above described desolvation is transferred to a 2 L beaker, to which 1000 g of polar solvent methanol is added, and then stirred for 3 minutes at room temperature, after which the beaker is allowed to stand. According to the above described treatment, silver fine particles precipitate on a bottom surface of the beaker during the process in which methanol is added and the mixture is stirred and then allowed to stand. On the other hand, unnecessary organic components contained in the mixture are dissolved in a supernatant, and thus a methanol solution having a brown color can be obtained. After removing the supernatant layer, 800 g of methanol is once again added to the precipitate and mixed therewith, and is allowed to stand in order to precipitate the silver fine particles, after which a supernatant methanol layer is removed. While monitoring how the supernatant methanol is to be colored, 500 g of methanol is further added to the precipitate, and similar operations are repeated. Then, it is confirmed that color development is no longer found as far as the supernatant methanol layer is visually observed, at a time point of adding 300 g of methanol to the precipitate and stirring them and allowing them to stand. After removing the supernatant methanol layer, a residual methanol solution remaining in the silver fine particles precipitated on a bottom surface of the beaker is volatilized and dried, and then blue fine powders can be obtained. In this dry powder, there exist 82% by mass of silver fine particles and 18% by mass in total of amine compounds as surface coating layers of the silver fine particles.

To the obtained blue fine powder, 102.8 g of N14 (tetradecane, melting point 5.86° C., boiling point 253.57° C., manufactured by Nikko Sekiyu Kagaku), and 300 g of hexane are added, and this mixture is heated to 80° C. for 1 hour with stirring. According to the stirring operation, the silver fine particles in the form of blue fine particles are dispersed again. The uniform dispersion liquid is filtered through a 0.2 μm membrane filter, and then the obtained filtrate containing hexane is subjected to desolvation by vacuum concentration, thereby preparing a stock dispersion liquid of silver nanoparticles.

15.5 g of an amine solution of the above described bis(2,4-pentadionate)Cu(II) is added to 100 g of the silver nanoparticle dispersion liquid which has been subjected to the above described treatment (content ratio of silver nanoparticles 63% by mass), and mixed with stirring by an agitation-defoaming machine. A liquid viscosity of the paste-like dispersion liquid thus obtained was 15 mPa·s (20° C.).

The paste-like dispersion liquid was applied to a glass substrate by the use of an ink jet printing method to form a uniform coating film having a size of 5 mm×50 mm and having a film thickness of 15 μm. Thereafter, the treated substrate was placed in a curing oven at 350° C., and kept for 60 minutes in an atmosphere while heating. After the heat treatment, a silver nanoparticle sintered product layer showing a mirror-like surface shape in a silver-white color is formed on a surface of the glass substrate. The obtained silver nanoparticle sintered product layer is estimated to have an average thickness of 1.8 μm, and is also estimated that the measured volume specific resistivity is 2.1 μΩ·cm provided that this sintered product layer is a rectangular conductor film having the above described average film thickness. The obtained silver nanoparticle sintered product layer is determined to have a good conductive characteristic, compared with silver per se whose resistivity is 1.59 μΩ·cm (20° C.).

Adhesion of the obtained silver nanoparticle sintered product layer against the glass substrate was evaluated by the method described below. We tried to eliminate the silver nanoparticle sintered product layer from a surface of the glass substrate by using a metal needle. Although irregular flaws were developed at some portions on a surface of the silver nanoparticle sintered product layer which were scratched by the metal needle, it was not found any portions at which a surface of the substrate was exposed due to stripping of the sintered product layer per se from the surface of the glass substrate.

Example 2

Carboxylate of Copper(II)

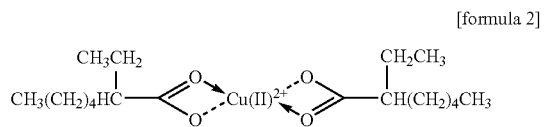

[formula 2]

An amine solution containing copper(II) 2-ethyl hexanoate presented above is prepared in accordance with the following procedure.

Ten grams of copper(II) 2-ethyl hexanoate (reagent: Wako Pure Chemical Industries, molecular weight 349.69, purity 98%), 50 g of N,N-dibutylaminopropylamine (molecular weight 186, boiling point 231° C.; Koei Chemical), 50 g of toluene (boiling point 110.6° C.), and methanol (boiling point 64.65° C.) are heated to 60° C. for 10 minutes with stirring, thereby dissolving copper(II) 2-ethyl hexanoate in this mixed solvent. From this solution, toluene and methanol are distilled out by the reduced-pressure distillation.

The solution after the above described distillation becomes a solution having a green color, whose weight is 60 g, and also becomes an amine solution of copper(II) 2-ethyl hexanoate. A content ratio of Cu in this solution is 4.45% by mass.

A commercially available dispersion liquid of silver ultrafine particles (brand name: independent dispersion ultra-fine particle (Dokuritsu Bunsan Chou-biryushi) Ag1T: manufactured by ULVAC Materials (Shinku Yakin)), specifically a dispersion liquid of silver fine particles having an average particle size of 5 nm which comprises 35 parts by mass of silver fine particles, 7 parts by mass of dodecylamine (molecular weight 185.36, boiling point 248° C.) as alkylamine, and 58 parts by mass of toluene (boiling point 110.6° C.) as an organic solvent is used to carry out the following treatment, thereby preparing a stock dispersion liquid of silver nanoparticles.

To a 1 L recovery flask in which 500 g of the above described commercially available dispersion liquid of silver ultra-fine particles Ag1T (containing 35 wt % of Ag) is contained, 87.5 g of N,N-dibutylaminopropylamine (boiling point 238° C.: manufactured by Koei Chemical) (50% by mass with respect to Ag solids) and 52.5 g of dipropyleneglycol (30% by mass with respect to Ag solids) are added and mixed, and then heated to 80° C. for 1 hour with stirring. After completing the stirring, vacuum concentration is carried out to perform desolvation of toluene contained in Ag1T.

A mixture after the above described desolvation is transferred to a 2 L beaker, to which 1000 g of polar solvent: methanol is added, and then stirred for 3 minutes at room temperature, after which the beaker is allowed to stand. According to the above described treatment, silver fine particles precipitate on a bottom surface of the beaker during the process in which methanol is added and the mixture is stirred and then allowed to stand. On the other hand, unnecessary organic components contained in the mixture are dissolved in a supernatant, and thus a methanol solution having a brown color can be obtained. After removing the supernatant layer, 800 g of methanol is once again added to the precipitate and mixed therewith, and is allowed to stand in order to precipitate the silver fine particles, after which a supernatant methanol layer is removed. While monitoring how the supernatant methanol layer is to be colored, 500 g of methanol is further added to the precipitate, and similar operations are repeated. Then, it is confirmed that color development is no longer found as far as the supernatant methanol layer is visually observed, at a time point of adding 300 g of methanol to the precipitate and stirring them and allowing them to stand. After removing the supernatant methanol layer, a residual methanol solution remaining in the silver fine particles precipitated on a bottom surface of the beaker is volatilized and dried, and then blue fine powders can be obtained. In this dry powder, there exist 82% by mass of silver fine particles and 18% by mass in total of amine compounds as surface coating layers of the silver fine particles.

To the obtained blue fine powder, 102.8 g of N14 (tetradecane, melting point 5.86° C., boiling point 253.57° C., manufactured by Nikko Sekiyu Kagaku), and 300 g of hexane are added, and this mixture is heated to 80° C. for 1 hour with stirring. According to the stirring operation, the silver fine particles in the form of blue fine particles are dispersed again. The uniform dispersion liquid is filtered through a 0.2 μm membrane filter, and then the obtained filtrate containing hexane is subjected to desolvation by vacuum concentration, thereby preparing a stock dispersion liquid of silver nanoparticles.

14.2 g of an amine solution of the above described copper (II) 2-ethyl hexanoate is added to 100 g of the silver nanoparticle dispersion liquid which has been subjected to the above described treatment (content ratio of silver nanoparticles 63% by mass), and mixed with stirring by an agitation-defoaming machine. A liquid viscosity of the paste-like dispersion liquid thus obtained was 10 mPa·s (20° C.).

The paste-like dispersion liquid was applied to a glass substrate by the use of an ink jet printing method to form a uniform coating film having a size of 5 mm×50 mm and having a film thickness of 15 μm. Thereafter, the treated substrate was placed in a curing oven at 350° C., and kept for 60 minutes in an atmosphere while heating. After the heat treatment, a silver nanoparticle sintered product layer showing a mirror-like surface shape in a silver-white color is formed on a surface of the glass substrate. The obtained silver nanoparticle sintered product layer is estimated to have an average thickness of 1.8 μm, and is also estimated that the measured volume specific resistivity is 2.1 μΩ·cm provided that this sintered product layer is a rectangular conductor film having the above described average film thickness. The obtained silver nanoparticle sintered product layer is determined to have a good conductive characteristic, compared with silver per se whose resistivity is 1.59 μΩ·cm (20° C.).

Adhesion of the obtained silver nanoparticle sintered product layer against the glass substrate was evaluated by the method described below. We tried to eliminate the silver nanoparticle sintered product layer from a surface of the glass substrate by using a metal needle. Although irregular flaws were developed at some portions on a surface of the silver nanoparticle sintered product layer which were scratched by the metal needle, it was not found any portions at which a surface of the substrate was exposed due to stripping of the sintered product layer per se from a surface of the glass substrate.

Example 3

Carboxylate of Bismuth(II)

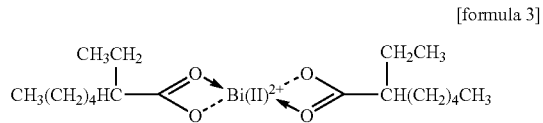

[formula 3]

An amine solution containing bismuth(II) 2-ethyl hexanoate presented above is prepared in accordance with the following procedure.

Ten grams of bismuth(II) 2-ethyl hexanoate/2-ethyl hexanoic acid solution (reagent: Wako Pure Chemical Industries, bismuth content ratio 25%), 50 g of N,N-dibutylaminopropylamine (boiling point 238° C.; Koei Chemical), 50 g of toluene (boiling point 110.6° C.), and methanol (boiling point 64.65° C.) are heated to 60° C. for 10 minutes with stirring, thereby dissolving bismuth(II) 2-ethyl hexanoate in this mixed solvent. From this solution, toluene and methanol are distilled out by the reduced-pressure distillation.

The solution after the above described distillation becomes a clear solution having a yellow color, whose weight is 60 g, and also becomes an amine solution of bismuth(II) 2-ethyl hexanoate. A content ratio of Bi in this solution is 4.17% by mass.

A commercially available dispersion liquid of silver ultra-fine particles (brand name: independent dispersion ultra-fine particle (Dokuritsu Bunsan Chou-biryushi) Ag1T: manufactured by ULVAC Materials (Shinku Yakin)), specifically a dispersion liquid of silver fine particles having an average particle size of 5 nm which comprises 35 parts by mass of silver fine particles, 7 parts by mass of dodecylamine (molecular weight 185.36, boiling point 248° C.) as alkylamine, and 58 parts by mass of toluene (boiling point 110.6° C.) as an organic solvent is used to carry out the following treatment, thereby preparing a stock dispersion liquid of silver nanoparticles.

To a 1 L recovery flask in which 500 g of the above described commercially available dispersion liquid of silver ultra-fine particles Ag1T (containing 35 wt % of Ag) is contained, 87.5 g of N,N-dibutylaminopropylamine (boiling point 238° C.: manufactured by Koei Chemical) (50% by mass with respect to Ag solids) and 52.5 g of dipropyleneglycol (30% by mass with respect to Ag solids) are added and mixed, and then heated to 80° C. for 1 hour with stirring. After completing the stirring, vacuum concentration is carried out to perform desolvation of toluene contained in Ag1T.

A mixture after the above described desolvation is transferred to a 2 L beaker, to which 1000 g of polar solvent methanol is added, and then stirred for 3 minutes at room temperature, after which the beaker is allowed to stand. According to the above described treatment, silver fine particles precipitate on a bottom surface of the beaker during the process in which methanol is added and the mixture is stirred and then allowed to stand. On the other hand, unnecessary organic components contained in the mixture are dissolved in a supernatant, and thus a methanol solution having a brown color can be obtained. After removing the supernatant layer, 800 g of methanol is once again added to the precipitate and mixed therewith, and is allowed to stand in order to precipitate the silver fine particles, after which a supernatant methanol layer is removed. While monitoring how the supernatant methanol is to be colored, 500 g of methanol is further added to the precipitate, and similar operations are repeated. Then, it is confirmed that color development is no longer found as far as the supernatant methanol layer is visually observed, at a time point of adding 300 g of methanol to the precipitate and stirring them and allowing them to stand. After removing the supernatant methanol layer, a residual methanol solution remaining in the silver fine particles precipitated on a bottom surface of the beaker is volatilized and dried, and then blue fine powders can be obtained. In this dry powder, there exist 82% by mass of silver fine particles and 18% by mass in total of amine compounds as surface coating layers of the silver fine particles.

To the obtained blue fine powder, 102.8 g of N14 (tetradecane, melting point 5.86° C., boiling point 253.57° C., manufactured by Nikko Sekiyu Kagaku), and 300 g of hexane are added, and this mixture is heated to 80° C. for 1 hour with stirring. According to the stirring operation, the silver fine particles in the form of blue fine particles are dispersed again. The uniform dispersion liquid is filtered through a 0.2 μm membrane filter, and then the obtained filtrate containing hexane is subjected to desolvation by vacuum concentration, thereby preparing a stock dispersion liquid of silver nanoparticles.

15.1 g of an amine solution of the above described bismuth (II) 2-ethyl hexanoate is added to 100 g of the silver nanoparticle dispersion liquid which has been subjected to the above described treatment (content ratio of silver nanoparticles 63% by mass), and mixed with stirring by an agitation-defoaming machine. A liquid viscosity of the paste-like dispersion liquid thus obtained was 11 mPa·s (20° C.).

The paste-like dispersion liquid was applied to a glass substrate by the use of an ink jet printing method to form a uniform coating film having a size of 5 mm×50 mm and having a film thickness of 12 μm. Thereafter, the treated substrate was placed in a curing oven at 350° C. which is higher than a melting point of metal bismuth (271.4° C.), and kept for 60 minutes in an atmosphere while heating. After the heat treatment, a silver nanoparticle sintered product layer showing a mirror-like surface shape in a silver-white color is formed on a surface of the glass substrate. The obtained silver nanoparticle sintered product layer is estimated to have an average thickness of 1.4 μm, and is also estimated that the measured volume specific resistivity is 2.6 μΩ·cm provided that this sintered product layer is a rectangular conductor film having the above described average film thickness. The obtained silver nanoparticle sintered product layer is determined to have a good conductive characteristic, compared with silver per se whose resistivity is 1.59 μΩ·cm (20° C.).

Adhesion of the obtained silver nanoparticle sintered product layer against the glass substrate was evaluated by the method described below. We tried to eliminate the silver nanoparticle sintered product layer from a surface of the glass substrate by using a metal needle. Although irregular flaws were developed at some portions on a surface of the silver nanoparticle sintered product layer which were scratched by the metal needle, it was not found any portions at which a surface of the substrate was exposed due to stripping of the sintered product layer per se from a surface of the glass substrate.

Example 4

A paste-like dispersion liquid is prepared by using a silver nanoparticle dispersion liquid which has been subjected to the treatment as described in Example 3 (content ratio of silver nanoparticles 63% by mass) and a bismuth(II) 2-ethylhexanoate/2-ethyl hexanoic acid solution (reagent: Wako Pure Chemical Industries content ratio of bismuth 25%). 2.52 g of a bismuth(II) 2-ethylhexanoate/2-ethyl hexanoic acid solution (content ratio of bismuth 25%) is added to 100 g of the silver nanoparticle dispersion liquid (content ratio of silver nanoparticles 63% by mass), and mixed with stirring by an agitation-defoaming machine. A liquid viscosity of the paste-like dispersion liquid thus obtained was 10 mPa·s (20° C.).

The paste-like dispersion liquid was applied to a glass substrate by the use of an ink jet printing method to form a uniform coating film having a size of 5 mm×50 mm and having a film thickness of 12 μm. Thereafter, the treated substrate was placed in a curing oven at 350° C. which is higher than a melting point of metal bismuth (271.4° C.), and kept for 60 minutes in an atmosphere while heating. After the heat treatment, a silver nanoparticle sintered product layer showing a mirror-like surface shape in a silver-white color is formed on a surface of the glass substrate. The obtained silver nanoparticle sintered product layer is estimated to have an average thickness of 1.4 μm, and is also estimated that the measured volume specific resistivity is 2.6 μΩ·cm provided that this sintered product layer is a rectangular conductor film having the above described average film thickness. The obtained silver nanoparticle sintered product layer is determined to have a good conductive characteristic, compared with silver per se whose resistivity is 1.59 μΩ·cm (20° C.).

Adhesion of the obtained silver nanoparticle sintered product layer against the glass substrate was evaluated by the method described below. We tried to eliminate the silver nanoparticle sintered product layer from a surface of the glass substrate by using a metal needle. Although irregular flaws were developed at some portions on a surface of the silver nanoparticle sintered product layer which were scratched by the metal needle, it was not found any portions at which a surface of the substrate was exposed due to stripping of the sintered product layer per se from a surface of the glass substrate.

Comparative Example 1

A silver nanoparticle dispersion liquid which has been subjected to a treatment as described in the above described Example 3 (content ratio of silver nanoparticles 63% by mass) is used as a dispersion liquid of silver nanoparticles. A liquid viscosity of the silver nanoparticle dispersion liquid (content ratio of silver nanoparticles 63% by mass) was 9 mPa·s (20° C.).

The paste-like dispersion liquid of silver nanoparticles, to which metal compounds were not added, was applied to a glass substrate by the use of an ink jet printing method to form a uniform coating film having a size of 5 mm×50 mm and having a film thickness of 2 μm. Thereafter, the treated substrate was placed in a curing oven at 350° C., and kept for 60 minutes in an atmosphere while heating. After the heat treatment, a silver nanoparticle sintered product layer showing a mirror-like surface shape in a silver-white color is formed on a surface of the glass substrate. The obtained silver nanoparticle sintered product layer is estimated to have an average thickness of 1.4 μm, and is also estimated that the measured volume specific resistivity is 1.9 μΩ·cm provided that this sintered product layer is a rectangular conductor film having the above described average film thickness. The obtained silver nanoparticle sintered product layer is determined to have a good conductive characteristic, compared with silver per se whose resistivity is 1.59 μΩ·cm (20° C.).

Adhesion of the obtained silver nanoparticle sintered product layer against the glass substrate was evaluated by the method described below. The inventors have tried to eliminate the silver nanoparticle sintered product layer from a surface of the glass substrate by using a metal needle. After scratching a surface of the silver nanoparticle sintered product layer by using the metal needle, it was found that a surface of the substrate was exposed at the scratched portion, because the sintered product layer per se was easily stripped off the surface of the glass substrate.

INDUSTRIAL APPLICABILITY

A conductive paste according to the present invention exhibits an excellent adhesion with respect to underlying substrates made of various materials as well as exhibiting an ability to fabricate a metal fine particle sintered product layer having a good conductive characteristic, by selecting a heat treatment temperature depending on the materials of the targeted underlying substrates after the paste is coated in an intended fine pattern on a flat surface of the underlying substrate such as a glass substrate by the use of a printing method.

The invention claimed is:

1. A conductive metal paste available for forming a metalic thin film layer of a metal fine particle sintered product on a surface of a substrate, characterized in that:
   a silanol structure (Si—O—H) exists on the surface of the substrate,
   the conductive metal paste is free from any resin;
   the conductive metal paste comprises metal fine particles having a fine average particle size dispersed uniformly in a dispersion solvent, one or more metal compounds, and an amine-based solvent capable of solving the one or more metal compounds;
   the conductive metal paste is free from any metal particle other than the metal fine particles;
   the average particle size for the metal fine particles having a fine average particle size is selected within a range from 1 nm to 20 nm;
   a surface of the metal fine particles is coated with one or more compounds having a group that contains a nitrogen, oxygen, or sulfur atom and is capable of coordinate bonding via a lone pair held by the atom, as a group capable of coordinate bonding with a metal element contained in the metal fine particles;
   metal species (M) contained in the one or more metal compounds are selected from the group consisting of copper and bismuth which exhibit adhesion to a material constituting a surface of the substrate;
   the conductive metal paste comprises 10 to 60 parts by mass in total of the one or more compounds having a group that contains a nitrogen, oxygen, or sulfur atom with respect to 100 parts by mass of the metal fine particles;

the conductive metal paste comprises the one or more metal compounds such that a ratio of metals contained in the one or more metal compounds to 100 parts by mass of the metal fine particles is 0.3 to 7 parts by mass in total;

a blending ratio of the amine-based solvent capable of solving the one or more metal compounds is selected such that the amine-based solvent is within a range from 100 to 500 parts by mass per 10 parts by mass in total of the metals contained in the one or more metal compounds; and the conductive metal paste comprises, as the dispersion solvent, one or more organic solvents which can solve the one or more compounds having a group containing a nitrogen, oxygen, or sulfur atom and which can uniformly dilute a solution comprising the metal compound and the amine-based solvent capable of solving the metal compound as well, wherein the metal species constituting the metal fine particles whose average particle size is selected within a range from 1 nm to 20 nm is a metal species selected from the group consisting of gold, silver, copper, platinum, and palladium, or an alloy of two or more thereof, the one or more compounds having the group that contains a nitrogen, oxygen, or sulfur atom are selected from the group consisting of primary alkyl amines whose alkyl group has C8 to C18, the metal compound is a metal compound comprising an organic anion species and a metal cation species whose oxidation number is 2, the organic anion species is selected from the group consisting of 2,4-pentanedionate ($[CH_3COCHCOCH_3]^-$) and carboxylate ($-COO^-$) derived from carboxylic acid, the metal species (M) used as the metal cation species whose oxidation number is 2 is a metal more base than the metal species constituting the metal fine particles, and is capable of being immobilized in the form of Si—O-M to the silanol structure (Si—O—H), in the conducive metal paste, the metal compound is comprised in the solution form, the amine-based solvent capable of solvating the one or more metal compounds is an amine-based solvent having a boiling point within a range from 150° C. to 300° C. which is selected from the group consisting of alkyl amines and polyamines, and the organic solvent used as the dispersion solvent is an organic solvent having a relatively high boiling point which is selected from the group consisting of non-polar solvents.

2. A conductive metal paste as claimed in claim 1, wherein the metal compound is a metal compound comprising the organic anion species and the metal cation species whose oxidation number is 2 in which the metal cation species whose oxidation number is 2 is included as a central metal cation species exhibiting hexacoordination and the organic anion species are coordinated with the central metal cation species as a bidentate ligand.

3. A conductive metal paste as claimed in claim 2, wherein the metal compound containing the organic anion species and the metal cation species whose oxidation number is 2 is a metal salt of organic acid comprising two carboxylates ($-COO^-$) derived from the carboxylic acid or a complex compound of the metal which has two 2,4-pentanedionate ($[CH_3COCHCOCH_3]^-$) as a ligand.

4. A conductive metal paste as claimed in claim 1, wherein the metal species constituting the metal fine particles is a metal species selected from the group consisting of gold, silver, platinum, and palladium, and the metal species contained in the one or more metal compounds is a metal selected from the group consisting of copper and bismuth.

5. A conductive metal paste as claimed in claim 1, wherein the metal species constituting the metal fine particles whose average particle size is selected within a range from 1 to 20 nm is silver.

6. A conductive metal paste as claimed in claim 1, wherein a metal compound, which can be subjected to reduction of a metal species contained therein so as to provide the metal atom when heated up to a temperature selected in a range from 250° C. to 600° C., is selected as the one or more metal compounds.

7. A conductive metal paste as claimed in claim 1, wherein copper or bismuth is selected as a metal species which is contained in the one or more metal compounds, when a material constituting a surface of the substrate is a glass material.

8. A conductive metal paste as claimed in claim 1, wherein the amine-based solvent capable of solvating the one or more metal compounds is an amine-based solvent having a boiling point within a range from 150° C. to 300° C. which is selected from the group consisting of N,N-dibutylaminopropylamine and N,N-diethylaminopropylamine.

9. A conductive metal paste as claimed in claim 1, wherein the organic solvent used as the dispersion solvent is a non-polar organic solvent having a relatively high boiling point which is selected from the group consisting of mineral spirit, tetradecane and dodecane.

10. A conductive metal paste as claimed in claim 1, wherein the conductive metal paste comprises the one or more metal compounds such that a ratio of metals contained in the one or more metal compounds to 100 parts by mass of the metal fine particles is 0.4 to 5 parts by mass in total.

11. A conductive metal paste as claimed in claim 1, wherein the blending ratio of the amine-based solvent capable of solving the one or more metal compounds is selected such that the amine-based solvent is within a range from 150 to 480 parts by mass per 10 parts by mass in total of the metals contained in the one or more metal compounds.

12. A conductive metal paste as claimed in claim 1,
wherein the metal cation species whose oxidation number is 2 is included as a central metal cation species exhibiting hexacoordination,
two of the organic anion species are coordinated with the central metal cation species as a bidentate ligand,
the remaining two coordination sites surrounding the metal cation species are occupied by the amine-based solvent molecules capable of being solvated, and thus,
the one or more metal compounds which are solvated by the amine-based solvent molecules are uniformly diluted in the organic solvent used as the dispersion solvent.

13. A conductive metal paste as claimed in claim 1,
wherein the average particle size for the metal fine particles having a fine average particle size is selected within a range from 5 to 20 nm.

14. A conductive metal paste as claimed in claim 1,
wherein the average particle size for the metal fine particles having a fine average particle size is selected within such a range that the average particle size is not extremely smaller than 10 nm, but at least the average particle size is smaller than 10 nm and no smaller than 1 nm.

* * * * *